United States Patent
Takita et al.

(10) Patent No.: US 7,985,497 B2
(45) Date of Patent: Jul. 26, 2011

(54) MULTI-LAYER, MICROPOROUS POLYETHYLENE MEMBRANE, ITS PRODUCTION METHOD, AND BATTERY SEPARATOR

(75) Inventors: Kotaro Takita, Nasushiobara (JP); Shintaro Kikuchi, Minuma-ku (JP)

(73) Assignee: Toray Tonen Specialty Separator Godo Kaisha, Tochigi (JP)

( * ) Notice: Subject to any disclaimer, the term of this patent is extended or adjusted under 35 U.S.C. 154(b) by 285 days.

(21) Appl. No.: 12/088,493

(22) PCT Filed: Sep. 27, 2006

(86) PCT No.: PCT/JP2006/319209
§ 371 (c)(1),
(2), (4) Date: Mar. 28, 2008

(87) PCT Pub. No.: WO2007/037290
PCT Pub. Date: Apr. 5, 2007

(65) Prior Publication Data
US 2009/0117455 A1    May 7, 2009

(30) Foreign Application Priority Data

Sep. 28, 2005  (JP) ................................ 2005-283031
Sep. 26, 2006  (JP) ................................ 2006-260636

(51) Int. Cl.
*H01M 2/16*    (2006.01)

(52) U.S. Cl. .................................... 429/129; 429/254
(58) Field of Classification Search .............. 429/129, 429/254
See application file for complete search history.

(56) References Cited

U.S. PATENT DOCUMENTS

| 5,240,655 A | * | 8/1993 | Troffkin et al. | ................ | 264/28 |
| 6,054,498 A | * | 4/2000 | Hasegawa et al. | .............. | 521/64 |

FOREIGN PATENT DOCUMENTS

| JP | 2002-338730 A | 11/2002 |
| JP | 2005-225919 A | 8/2005 |
| WO | 97/23554 A1 | 7/1997 |

* cited by examiner

*Primary Examiner* — Christina Johnson
*Assistant Examiner* — Larry Thrower
(74) *Attorney, Agent, or Firm* — Sughrue Mion, PLLC

(57) ABSTRACT

A multi-layer, microporous polyethylene membrane having at least two layers, which comprises (a) a microporous polyethylene resin layer A comprising high-density polyethylene A having 0.2 or more terminal vinyl groups per 10,000 carbon atoms when measured by infrared spectroscopy, and (b) a microporous polyethylene resin layer B comprising high-density polyethylene B having less than 0.2 terminal vinyl groups per 10,000 carbon atoms when measured by infrared spectroscopy, has well-balanced permeability, mechanical strength, heat shrinkage resistance, shutdown properties, meltdown properties and oxidation resistance.

1 Claim, No Drawings

MULTI-LAYER, MICROPOROUS POLYETHYLENE MEMBRANE, ITS PRODUCTION METHOD, AND BATTERY SEPARATOR

This is a 371 of Application No. PCT/JP2006/319209 filed Sep. 27, 2006, claiming the priority of JP2005-283031 filed Sep. 28, 2005 and JP2006-260636 filed Sep. 26, 2006, all of which are hereby incorporated by reference.

FIELD OF THE INVENTION

This invention relates to a multi-layer, microporous polyethylene membrane, its production method, and battery separator, particularly to a multi-layer, microporous polyethylene membrane having well-balanced permeability, mechanical strength, heat shrinkage resistance, shutdown properties, meltdown properties and oxidation resistance, its production method, and a battery separator.

BACKGROUND OF THE INVENTION

Microporous polyethylene membranes are widely used in separators for lithium batteries, etc., electrolytic capacitor separators, various filters, etc. When the microporous polyethylene membranes are used as battery separators, their performance largely affects the performance, productivity and safety of batteries. Accordingly, the microporous polyethylene membranes are required to have excellent permeability, mechanical properties, heat shrinkage resistance, shutdown properties, meltdown properties, etc. For instance, when microporous polyethylene membranes having low mechanical strength are used as battery separators, battery voltage soon becomes low.

To improve the properties of microporous polyethylene membranes, the optimization of starting material compositions, stretching conditions, heat treatment conditions, etc. have been proposed. WO 97/23554 discloses a microporous membrane having high short-circuiting resistance (shutdown properties), which is made of high-density polyethylene or linear ethylene copolymer having 2 or more terminal vinyl groups per 10,000 carbon atoms when measured by infrared spectroscopy.

Recently gaining importance as separator characteristics are not only permeability, mechanical strength, heat shrinkage resistance and thermal properties (shutdown properties and meltdown properties), but also battery life properties such as cyclability, battery storability such as oxidation resistance, and battery productivity such as electrolytic solution absorbability. To obtain excellent cyclability and electrolytic solution absorbability, microporous membranes should have excellent permeability and mechanical strength. To obtain excellent safety properties, microporous membranes should have excellent shutdown properties and heat shrinkage resistance. However, microporous membranes for battery separators having well-balanced permeability, mechanical strength, heat shrinkage resistance, shutdown properties, meltdown properties and oxidation resistance have not actually been obtained yet.

OBJECT OF THE INVENTION

Accordingly, an object of this invention is to provide a multi-layer, microporous polyethylene membrane having well-balanced permeability, mechanical strength, heat shrinkage resistance, shutdown properties, meltdown properties and oxidation resistance, its production method, and a battery separator.

DISCLOSURE OF THE INVENTION

As a result of intense research in view of the above object, the inventors have found that a multi-layer, microporous polyethylene membrane comprising (a) a microporous polyethylene resin layer A comprising high-density polyethylene A having a terminal vinyl group concentration at a predetermined level or more, and (b) a microporous polyethylene resin layer B comprising high-density polyethylene B having a terminal vinyl group concentration less than a predetermined level, has well-balanced permeability, mechanical strength, heat shrinkage resistance, shutdown properties, meltdown properties and oxidation resistance. This invention has been completed based on such finding.

Thus, the multi-layer, microporous polyethylene membrane of this invention has at least two layers, comprising (a) a microporous polyethylene resin layer A comprising high-density polyethylene A having 0.2 or more terminal vinyl groups per 10,000 carbon atoms when measured by infrared spectroscopy, and (b) a microporous polyethylene resin layer B comprising high-density polyethylene B having less than 0.2 terminal vinyl groups per 10,000 carbon atoms when measured by infrared spectroscopy.

The concentration of the terminal vinyl groups in the high-density polyethylene A is preferably 0.4 or more, more preferably 0.6 or more, per 10,000 carbon atoms. The concentration of the terminal vinyl groups in the high-density polyethylene B is preferably less than 0.15 per 10,000 carbon atoms. The high-density polyethylenes A and B preferably have a mass-average molecular weight (Mw) of $5 \times 10^5$ or less, a ratio of Mw to the number-average molecular weight (Mn) being 5 to 300.

The microporous polyethylene resin layer A is preferably made of a polyethylene composition A comprising the high-density polyethylene A and ultra-high-molecular-weight polyethylene having a mass-average molecular weight of $7 \times 10^5$ or more. The mass ratio of the high-density polyethylene A to the ultra-high-molecular-weight polyethylene in the polyethylene composition A is preferably 50/50 to 99/1.

The microporous polyethylene resin layer B is preferably made of a polyethylene composition B comprising the high-density polyethylene B and ultra-high-molecular-weight polyethylene having a mass-average molecular weight of $7 \times 10^5$ or more. The mass ratio of the high-density polyethylene B to the ultra-high-molecular-weight polyethylene in the polyethylene composition B is preferably 50/50 to 99/1.

Each of the polyethylene compositions A and B preferably has a mass-average molecular weight of $1 \times 10^4$ to $5 \times 10^6$ and Mw/Mn of 5 to 300.

The first method of this invention for producing a multi-layer, microporous polyethylene membrane comprises the steps of (1) melt-blending a polyethylene resin A comprising high-density polyethylene A having 0.2 or more terminal vinyl groups per 10,000 carbon atoms when measured by infrared spectroscopy, with a membrane-forming solvent to prepare a polyethylene resin solution A, (2) melt-blending a polyethylene resin B comprising high-density polyethylene B having less than 0.2 terminal vinyl groups per 10,000 carbon atoms when measured by infrared spectroscopy, with a membrane-forming solvent to prepare a polyethylene resin solution B, (3) simultaneously extruding the polyethylene resin solutions A and B from a die, (4) cooling the resultant extrudate to provide a gel-like laminate sheet, and (5) removing the membrane-forming solvent from the gel-like laminate sheet.

The second method of this invention for producing a multi-layer, microporous polyethylene membrane comprises the steps of (1) melt-blending a polyethylene resin A comprising high-density polyethylene A having 0.2 or more terminal vinyl groups per 10,000 carbon atoms when measured by infrared spectroscopy, with a membrane-forming solvent to prepare a polyethylene resin solution A, (2) melt-blending a polyethylene resin B comprising high-density polyethylene B having less than 0.2 terminal vinyl groups per 10,000 carbon atoms when measured by infrared spectroscopy, with a membrane-forming solvent to prepare a polyethylene resin solution B, (3) extruding the polyethylene resin solutions A and B from separate dies, (4) cooling the resultant extrudates A and B to provide gel-like sheets A and B, (5) removing the membrane-forming solvent from the gel-like sheets A and B to form microporous polyethylene membranes A and B, and (6) laminating the microporous polyethylene membranes A and B.

In the first and second methods, there is preferably a resin concentration difference between the polyethylene resin solutions A and B, to obtain a multi-layer, microporous polyethylene membrane having a structure in which the average pore diameter changes in a thickness direction (gradient structure). The resin concentration difference between the polyethylene resin solutions A and B is preferably 5% or more by mass, more preferably 10% or more by mass.

The battery separator of this invention is formed by the above multi-layer, microporous polyethylene membrane.

DESCRIPTION OF THE PREFERRED EMBODIMENTS

[1] Polyethylene resin A

A polyethylene resin A forming a microporous polyethylene resin layer A (referred to as "microporous layer A" unless otherwise mentioned) in the multi-layer, microporous polyethylene membrane of this invention (hereinafter referred to simply as "multi-layer microporous membrane" or "microporous membrane") can be (a) high-density polyethylene A having 0.2 or more terminal vinyl groups per 10,000 carbon atoms when measured by infrared spectroscopy, (b) a mixture of the high-density polyethylene A with the other polyethylene (polyethylene composition A), (c) a mixture of (a) or (b) with a polyolefin other than polyethylene, polypropylene and polymethylpentene (polyolefin composition A), or (d) a mixture of any one of (a) to (c) with a heat-resistant resin having a melting point or glass transition temperature Tg of 150° C. or higher (heat-resistant polyethylene resin composition A).

(a) High-density polyethylene A

The high-density polyethylene A has 0.2 or more terminal vinyl groups per 10,000 carbon atoms when measured by infrared spectroscopy. When the terminal vinyl group concentration is less than 0.2, the multi-layer, microporous membrane has insufficient shutdown properties. The terminal vinyl group concentration is preferably 0.4 or more, more preferably 0.6 or more.

The terminal vinyl group concentration (unit: "/10,000 C") is expressed by the number of terminal vinyl groups per 10,000 carbon atoms in the high-density polyethylene A, which is measured by infrared spectroscopy. Specifically, a sample of about 1 mm in thickness obtained by heat-pressing high-density polyethylene A pellets is measured with respect to absorbance expressed by $A=\log(I_0/I)$, wherein A represents absorbance, $I_0$ represents the transmitted light intensity of a blank cell, and I represents the transmitted light intensity of a sample cell, at a peak of 910 cm$^{-1}$ by a Fourier transform infrared spectrophotometer (FREEXACT-II available from Horiba, Ltd.), and the terminal vinyl group concentration is calculated by the following formula: (/10,000 C)=(1.14×absorbance)/[density (g/cm$^3$) of polyethylene×sample thickness (mm)].

Through not particularly critical, the high-density polyethylene A preferably has a mass-average molecular weight (Mw) of $1\times10^4$ to $5\times10^5$. When the Mw of the high-density polyethylene A is $5\times10^5$ or less, the microporous layer A can have an increased average pore diameter. The density of the high-density polyethylene A is usually 0.90 to 0.98 g/cm$^3$, preferably 0.93 to 0.97 g/cm$^3$, more preferably 0.94 to 0.96 g/cm$^3$.

The high-density polyethylene A is preferably a homopolymer, but can be a copolymer containing a small amount of other α-olefin(s). The other α-olefins include propylene, butene-1, pentene-1, hexene-1,4-methylpentene-1, octene, vinyl acetate, methyl methacrylate, styrene, etc.

The above high-density polyethylene A can be produced, for instance, by the method described in JP 1-12777 B, which conducts the suspension polymerization, solution polymerization or gas phase polymerization of ethylene using a catalyst comprising a combination of an organic metal compound and a chromium compound.

(b) Polyethylene composition A

The polyethylene composition A is a mixture of the high-density polyethylene A and polyethylene other than the high-density polyethylene A. The high-density polyethylene A can be the same as described above. The other polyethylene than the high-density polyethylene A is preferably ultra-high-molecular-weight polyethylene, intermediate-density polyethylene, branched low-density polyethylene, and linear low-density polyethylene. The polyethylene composition A is preferably a combination of the high-density polyethylene A and the ultra-high-molecular-weight polyethylene.

The ultra-high-molecular-weight polyethylene has Mw of $7\times10^5$ or more. The ultra-high-molecular-weight polyethylene can be not only an ethylene homopolymer, but also an ethylene-α-olefin copolymer containing a small amount of other α-olefin(s). The other α-olefins than ethylene are preferably propylene, butene-1, pentene-1, hexene-1,4-methylpentene-1, octene, vinyl acetate, methyl methacrylate, and styrene. The Mw of the ultra-high-molecular-weight polyethylene is preferably $1\times10^6$ to $15\times10^6$, more preferably $1\times10^6$ to $5\times10^6$.

The intermediate-density polyethylene, the branched low-density polyethylene, and the linear low-density polyethylene have Mw of $1\times10^4$ to $5\times10^5$. The polyethylene having Mw of $1\times10^4$ to $5\times10^5$ can be not only an ethylene homopolymer, but also a copolymer containing a small amount of other α-olefin(s) such as propylene, butene-1, hexene-1, etc. Such copolymers are preferably produced using single-site catalysts.

The Mw of the polyethylene composition A is preferably $1\times10^4$ to $5\times10^6$, more preferably $1\times10^5$ to $4\times10^6$, further preferably $1\times10^5$ to $1\times10^6$. With the polyethylene composition A having Mw of $1\times10^6$ or less, the microporous layer A has an increased average pore diameter.

The content of the polyethylene other than the high-density polyethylene A is preferably 1% or more by mass, more preferably 2 to 50% by mass, based on 100% by mass of the entire polyethylene composition A.

(c) Polyolefin composition A

The polyolefin composition A is a mixture of the high-density polyethylene A or the polyethylene composition A, with a polyolefin other than polyethylene, polypropylene and polymethylpentene. The high-density polyethylene A and the polyethylene composition A can be the same as described above.

The polyolefin other than polyethylene, polypropylene and polymethylpentene can be at least one selected from the group consisting of polybutene-1, polypentene-1, polyhexene-1, polyoctene-1, polyvinyl acetate, polymethyl methacrylate, polystyrene and ethylene-α-olefin copolymers each having Mw of $1\times10^4$ to $4\times10^6$, and a polyethylene wax having Mw of $1\times10^3$ to $1\times10^4$. Polybutene-1, polypentene-1, polyhexene-1, polyoctene-1, polyvinyl acetate, polymethyl methacrylate and polystyrene can be not only homopolymers, but also copolymers containing other α-olefin(s). The content of the polyolefin other than polyethylene, polypropylene and polymethylpentene is preferably 20% or less by mass, more preferably 10% or less by mass, based on 100% by mass of the entire polyolefin composition A.

(d) Heat-resistant polyethylene resin composition A

The heat-resistant polyethylene resin composition A is a mixture of any one of (a)-(c) above and a heat-resistant resin having a melting point or glass transition temperature Tg of 150° C. or higher. The heat-resistant resin is preferably a crystalline resin (including partially crystalline resin) having a melting point of 150° C. or higher, or an amorphous resin having Tg of 150° C. or higher. The melting point and Tg can be measured according to JIS K7121.

Because a battery separator formed by a multi-layer, microporous membrane comprising the polyethylene resin A containing the heat-resistant resin has an improved meltdown temperature, batteries are provided with improved high-temperature-storability. The heat-resistant resin is dispersed in the form of spherical or ellipsoidal fine particles in the homopolymer or composition described in (a)-(c) above during melt blending. Fibrils of polyethylene phases (phase of high-density polyethylene A or polyethylene composition A, and phase of high-density polyethylene B or polyethylene composition B) are cleft with fine, heat-resistant resin particles as nuclei during stretching, thereby forming craze-like pores holding fine particles in the center. Accordingly, a battery separator formed by the multi-layer, microporous membrane has improved compression resistance and electrolytic solution absorbability. The particle sizes of the spherical fine particles and the major axes of the ellipsoidal fine particles are preferably 0.1 to 15 µm, more preferably 0.5 to 10 µm, particularly 1 to 10 µm.

Through not particularly critical, the upper limit of the melting point or Tg of the heat-resistant resin is preferably 350° C., from the aspect of blendability with the homopolymer or composition described in (a) to (c) above. The melting point or Tg of the heat-resistant resin is preferably 170 to 260° C. more.

The Mw of the heat-resistant resin is preferably $1\times10^3$ to $1\times10^6$, more preferably $1\times10^4$ to $7\times10^5$, though variable depending on the type of the resin. The heat-resistant resin having Mw of more than $7\times10^5$ cannot easily be blended with the homopolymer or composition described in (a) to (c) above.

Specific examples of the heat-resistant resin include polyesters, polypropylene (PP), polymethylpentene [PMP or TPX (transparent polymer X)], fluororesins, polyamides (PA, melting point: 215 to 265° C.), polyarylene sulfides (PAS), polystyrene (PS, melting point: 230° C.), polyvinyl alcohol (PVA, melting point: 220 to 240° C.), polyimides (PI, Tg: 280° C. or higher), polyamideimides (PAI, Tg: 280° C.), polyethersulfone (PES, Tg: 223° C.), polyetheretherketone (PEEK, melting point: 334° C.), polycarbonates (PC, melting point: 220 to 240° C.), cellulose acetate (melting point: 220° C.), cellulose triacetate (melting point: 300° C.), polysulfone (Tg: 190° C.), polyetherimides (melting point: 216° C.), etc. The heat-resistant resin can be composed of not only a single resin component but also pluralities of resin components.

The polyesters include polybutylene terephthalate (PBT, melting point: about 160 to 230° C.), polyethylene terephthalate (PET, melting point: about 250 to 270° C.), polyethylene naphthalate (PEN, melting point: 272° C.), polybutylene naphthalate (PBN, melting point: 245° C.), etc., and PBT is preferable.

The PBT is essentially a saturated polyester composed of 1,4-butanediol and terephthalic acid. Within ranges not deteriorating properties such as heat resistance, compression resistance, heat shrinkage resistance, etc., other diols than 1,4-butanediol and other carboxylic acids than terephthalic acid can be included as comonomers. Such diols can be, for instance, ethylene glycol, diethylene glycol, neopentyl glycol, 1,4-cyclohexanemethanol, etc. The dicarboxylic acids can be, for instance, isophthalic acid, sebacic acid, adipic acid, azelaic acid, succinic acid, etc. A specific example of PBT resins can be, for instance, a homo-PBT resin commercially available from Toray Industries, Inc. under the tradename of "Toraycon." PBT can be composed of not only a single component but also pluralities of PBT resin components. PBT particularly has Mw of $2\times4$ to $3\times10^5$.

Polypropylene can be not only a homopolymer, but also a block or random copolymer containing other α-olefins or diolefins. The other olefins are preferably ethylene or α-olefins having 4 to 8 carbon atoms. The α-olefins having 4 to 8 carbon atoms include, for instance, 1-butene, 1-hexene, 4-methyl-1-pentene, etc. The diolefins preferably have 4 to 14 carbon atoms. The diolefins having 4 to 14 carbon atoms include, for instance, butadiene, 1,5-hexadiene, 1,7-octadiene, 1,9-decadiene, etc. The content of the other olefin or diolefin is preferably less than 10% by mole, based on 100% by mole of the propylene copolymer.

The polypropylene particularly has Mw of $1\times10^5$ to $8\times10^5$ The molecular weight distribution (Mw/Mn) of the polypropylene is preferably 1.01 to 100, more preferably 1.1 to 50. The polypropylene can be a single substance or a composition of two or more types of polypropylene. The polypropylene preferably has a melting point of 155 to 175° C. Because such polypropylene is dispersed in the form of fine particles having shapes and particle sizes as described above in the homopolymer or composition described in (a) to (c) above, fibrils constituting the microporous layer A are cleft with fine polypropylene particles as nuclei, thereby providing pores formed by craze-like voids.

Polymethylpentene is essentially a polyolefin constituted by any one of 4-methyl-1-pentene, 2-methyl-1-pentene, 2-methyl-2-pentene, 3-methyl-1-pentene and 3-methyl-2-pentene, and a 4-methyl-1-pentene homopolymer is preferable. The polymethylpentene can be a copolymer containing a small amount of an α-olefin other than methylpentene within a range not deteriorating properties such as heat resistance, compression resistance, heat shrinkage resistance, etc. The α-olefins other than methylpentene are suitably ethylene, propylene, butene-1, pentene-1, hexene-1, octene, vinyl acetate, methyl methacrylate, styrene, etc. The polymethylpentene usually has a melting point of 230 to 245° C. The polymethylpentene particularly has Mw of $3\times10^5$ to $7\times10^5$.

The fluororesins include polyvinylidene fluoride (PVDF, melting point: 171° C.), polytetrafluoroethylene (PTFE, melting point: 327° C.), a tetrafluoroethylene-perfluoroalkylvinyl ether copolymer (PFA, melting point: 310° C.), a tetrafluoroethylene-hexafluoropropylene-perfluoro(propylvinyl ether) copolymer (EPE, melting point: 295° C.), a tetrafluoroethylene-hexafluoropropylene copolymer (FEP, melting point: 275° C.), an ethylene-tetrafluoroethylene copolymer (ETFE, melting point: 270° C.), etc.

The fluororesin is preferably PVDF. PVDF can be a copolymer (vinylidene fluoride copolymer) with other olefins. The vinylidene fluoride content in the vinylidene fluoride copolymer is preferably 75% or more by mass, more preferably 90% or more by mass. Monomers copolymerizable with vinylidene fluoride include hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate, isopropenyl acetate, etc. The preferred vinylidene fluoride copolymer is a hexafluoropropylene-vinylidene fluoride copolymer.

The polyamide is preferably at least one selected from the group consisting of polyamide 6 (6-nylon), polyamide 66 (6,6-nylon), polyamide 12 (12-nylon) and amorphous polyamide.

The polyarylene sulfide is preferably polyphenylene sulfide (PES) having a melting point of 285° C. The polyarylene sulfide can be linear or branched.

The content of the heat-resistant resin is preferably 3 to 30% by mass, more preferably 5 to 25% by mass, based on 100% by mass of the entire heat-resistant polyethylene resin composition A. When this content is more than 30% by mass, the membrane has low pin puncture strength, tensile rupture strength and flatness.

(e) Molecular weight distribution Mw/Mn

Mw/Mn is a measure of a molecular weight distribution, the larger this value, the wider the molecular weight distribution. Though not critical, the Mw/Mn of the polyethylene resin A is preferably 5 to 300, more preferably 5 to 100, when the polyethylene resin A is composed of the high-density polyethylene A or the polyethylene composition A. With this molecular weight distribution within a range of 5 to 300, the microporous layer A has an increased average pore diameter. The Mw/Mn of polyethylene (homopolymer or ethylene-α-olefin copolymer) can be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition A, the larger the Mw/Mn, the larger difference in Mw between the ultra-high-molecular-weight polyethylene and the other polyethylene, and vice versa. The Mw/Mn of the polyethylene composition A can be properly controlled by the molecular weight and percentage of each component.

[2] Polyethylene resin B

A polyethylene resin B forming a microporous polyethylene resin layer B (referred to as "microporous layer B" unless otherwise mentioned) in the multi-layer, microporous membrane can be (a) high-density polyethylene B having less than 0.2 terminal vinyl groups per 10,000 carbon atoms when measured by infrared spectroscopy, (b) a mixture of the high-density polyethylene B with the other polyethylene (polyethylene composition B), (c) a mixture of (a) or (b) with a polyolefin other than polyethylene, polypropylene and polymethylpentene (polyolefin composition B), or (d) a mixture of any one of (a) to (c) with a heat-resistant resin having a melting point or glass transition temperature Tg of 150° C. or higher (heat-resistant polyethylene resin composition B).

(a) High-density polyethylene B

The high-density polyethylene B has less than 0.2 terminal vinyl groups per 10,000 carbon atoms when measured by infrared spectroscopy. When the terminal vinyl group concentration is 0.2 or more, the multi-layer, microporous membrane has insufficient permeability and mechanical strength. The terminal vinyl group concentration is preferably 0.15 or less. The terminal vinyl group concentration of the high-density polyethylene B is determined in the same manner as above.

The high-density polyethylene B can have the same Mw and density as those of the high-density polyethylene A. When the Mw of the high-density polyethylene B is $5 \times 10^5$ or less, the microporous layer B has an increased average pore diameter. Like the high-density polyethylene A, the high-density polyethylene B is preferably a homopolymer, but can be a copolymer containing a small amount of other α-olefin(s).

The above high-density polyethylene B can be produced, for instance, by the method described in JP 1-12777 B, which conducts the suspension polymerization, solution polymerization or gas phase polymerization of ethylene using a Ziegler catalyst comprising a magnesium compound.

(b) Polyethylene composition B

The polyethylene composition B is a mixture of the high-density polyethylene B with polyethylene other than the high-density polyethylene B. The high-density polyethylene B can be the same as described above. The polyethylene other than the high-density polyethylene B can be the same as the polyethylene other than the high-density polyethylene A in the polyethylene composition A. The polyethylene composition B is preferably a combination of the high-density polyethylene B and the above ultra-high-molecular-weight polyethylene. The Mw of the polyethylene composition B can be the same as that of the polyethylene composition A. With the polyethylene composition B having Mw of $1 \times 10^6$ or less, the microporous layer B has an increased average pore diameter.

The content of the polyethylene other than the high-density polyethylene B in the polyethylene composition B is preferably 1% or more by mass, more preferably 2 to 50% by mass, based on 100% by mass of the entire polyethylene composition B.

(c) Polyolefin composition B

The polyolefin composition B is a mixture of the high-density polyethylene B or the polyethylene composition B, with a polyolefin other than polyethylene, polypropylene and polymethylpentene. The high-density polyethylene B, the polyethylene composition B, and the polyolefin other than polyethylene, polypropylene and polymethylpentene can be the same as described above. The content of the polyolefin other than polyethylene, polypropylene and polymethylpentene is preferably 20% or less by mass, more preferably 10% or less by mass, based on 100% by mass of the entire polyolefin composition B.

(d) Heat-resistant polyethylene resin composition B

The heat-resistant polyethylene resin composition B is a mixture of any one of (a) to (c) above, with a heat-resistant resin having a melting point or glass transition temperature Tg of 150° C. or higher. The heat-resistant resin and its content can be the same as those of the heat-resistant polyethylene resin composition A.

(e) Molecular weight distribution Mw/Mn

The Mw/Mn of the polyethylene resin B is preferably 5 to 300, more preferably 5 to 100, particularly 5 to 25, when the polyethylene resin B is the high-density polyethylene B or the polyethylene composition B. With the molecular weight distribution within a range of 5 to 300, the microporous layer B has an increased average pore diameter. The molecular weight distribution can be controlled in the same manner as described above.

[3] Fillers

The polyethylene resins A and B can contain fillers. The fillers can be inorganic or organic fillers. The inorganic fillers include silica, alumina, silica-alumina, zeolite, mica, clay, kaolin, talc, calcium carbonate, calcium oxide, calcium sulfate, barium carbonate, barium sulfate, magnesium carbonate, magnesium sulfate, magnesium oxide, diatomaceous earth, glass powder, aluminum hydroxide, titanium dioxide, zinc oxide, satin white, acid clay, etc. The inorganic fillers can be used alone or in combination. Among them, silica and/or calcium carbonate are preferably used. The organic fillers are preferably made of the above heat-resistant resins.

The shapes of filler particles are not particularly critical, but spherical or pulverized fillers, for instance, can be properly selected, and spherical fillers are preferable. The particle size of the fillers is preferably 0.1 to 15 µm, more preferably 0.5 to 10 µm. The fillers can be surface-treated. Surface-treating agents for the fillers include, for instance, various silane coupling agents, aliphatic acids such as stearic acid or their derivatives, etc.

The addition of fillers to either one of the polyethylene resins A and B improves the electrolytic solution absorbability. This appears to be due to the fact that with fillers added, fibrils constituting the microporous layer are cleft with filler particles as nuclei, thereby forming craze-like voids (pores) and thus increasing the volume of voids (pores). It is presumed that filler particles are held in such pores. It is presumed that filler particles are held in such pores.

The amount of fillers added to the polyethylene resin A or B is preferably 0.1 to 5 parts by mass, more preferably 0.5 to 3 parts by mass, based on 100 parts by mass of the total amount of the polyethylene resin and the fillers. When this content is more than 5 parts by mass, the membrane has low pin puncture strength and compression deformability, resulting in the detachment of fillers while slitting. A large amount of powder generated by the detachment of fillers is likely to form defects such as pinholes, specks (impurity), etc. in the multi-layer, microporous membrane products.

[4] Production method of multi-Layer, microporous polyethylene membrane (a) First production method The first production method for producing a multi-layer, microporous polyethylene membrane of this invention comprises the steps of (1) melt-blending each of the above polyethylene resins A and B with a membrane-forming solvent to prepare each polyethylene resin solution A, B, (2) simultaneously extruding the polyethylene resin solutions A and B through a die, (3) cooling the extrudate to provide a gel-like laminate sheet, (4) removing the membrane-forming solvent from the gel-like laminate sheet, and (5) drying the resultant membrane. Before the step (4), if necessary, any one of a stretching step, a heat-setting step, a heat roll treatment step and a hot solvent treatment step can be conducted. After the step (5), a re-stretching step, a heat treatment step, a hot solvent treatment step, a cross-linking step with ionizing radiations, a hydrophilizing step, a surface-coating step, etc. can be conducted.

(1) Preparation of polyethylene resin solution

Each of the above polyethylene resins A, B and a proper membrane-forming solvent are melt-blended to prepare a polyethylene resin solution A, B (simply called "resin solution A, B" unless otherwise mentioned).

Each resin solution A, B can contain various additives such as fillers, antioxidants, ultraviolet absorbents, antiblocking agents, pigments, dyes, etc., if necessary, in ranges not deteriorating the effects of this invention. Fine silicate powder, for instance, can be added as a pore-forming agent.

The membrane-forming solvent is preferably liquid at room temperature. The use of a liquid solvent enables stretching at a relatively high magnification. The liquid solvents can be linear or cyclic aliphatic hydrocarbons such as nonane, decane, decalin, p-xylene, undecane, dodecane, liquid paraffin, etc.; mineral oil distillates having boiling points corresponding to those of the above hydrocarbons; and phthalates liquid at room temperature, such as dibutyl phthalate, dioctyl phthalate, etc. To obtain a gel-like sheet having a stable liquid solvent content, it is preferable to use non-volatile liquid solvents such as liquid paraffin. Also, a solvent miscible with the polyethylene resins A and B in melt blending but solid at room temperature can be added to the liquid solvent. Such solid solvents are stearyl alcohol, ceryl alcohol, paraffin wax, etc. However, the use of a solid solvent only results in the likelihood of uneven stretching, etc.

The viscosity of the liquid solvent is preferably 30 to 500 cSt, more preferably 50 to 200 cSt, at a temperature of 25° C. When the viscosity at 25° C. is less than 30 cSt, the resin solutions A and B are unevenly extruded through a die lip, resulting in difficulty in blending. The viscosity of more than 500 cSt makes the removal of the liquid solvent difficult.

Though not particularly critical, the uniform melt blending of the resin solutions A and B is preferably conducted in a double-screw extruder. Melt-blending in a double-screw extruder is suitable for preparing high-concentration resin solutions A and B. The melt-blending temperature of the resin solution A is preferably the melting point $Tm_a$ of the polyethylene resin A+10° C. to the melting point $Tm_a$+100° C. When the polyethylene resin A is the high-density polyethylene A or the polyethylene composition A, the melting point $Tm_a$ of the polyethylene resin A is its melting point. When the polyethylene resin A is the polyolefin composition A or the heat-resistant polyethylene resin composition A, the melting point $Tm_a$ of the polyethylene resin A is the melting point of the high-density polyethylene A or the polyethylene composition A contained in the polyolefin composition A or the heat-resistant polyethylene resin composition A. The melt-blending temperature of the resin solution B is preferably the melting point $Tm_b$ of the polyethylene resin B+10° C. to the melting point $Tm_b$+100° C. When the polyethylene resin B is the high-density polyethylene B or the polyethylene composition B, the melting point $Tm_b$ of the polyethylene resin B is its melting point. When the polyethylene resin B is the polyolefin composition B or the heat-resistant polyethylene resin composition B, the melting point $Tm_b$ of the polyethylene resin B is the melting point of the high-density polyethylene B or the polyethylene composition B contained in the polyolefin composition B or the heat-resistant polyethylene resin composition B.

The high-density polyethylenes A and B, and the polyethylene compositions A and B have melting points of about 130 to 140° C. Accordingly, the melt-blending temperature is preferably in a range of 140 to 250° C., more preferably in a range of 170 to 240° C. However, when the polyethylene resin A is the heat-resistant polyethylene resin composition A, the melt-blending temperature is more preferably in a range from the melting point of the heat-resistant resin to the melting point+100° C., particularly the melting point of the heat-resistant resin to the melting point $Tm_a$+100° C. When the polyethylene resin B is the heat-resistant polyethylene resin composition B, the melt-blending temperature is more preferably the melting point of the heat-resistant resin to the melting point+100° C., particularly the melting point of the heat-resistant resin to the melting point $Tm_b$+100° C. The membrane-forming solvent can be added before blending, or charged into the double-screw extruder at an intermediate position during blending, though the latter is preferable. In the melt blending, an antioxidant is preferably added to prevent the oxidization of the polyethylene resins A and B.

The concentration of the polyethylene resin in each of the resin solutions A and B is 10 to 50% by mass, preferably 25 to 45% by mass, based on 100% by mass of the total amount of the polyethylene resin and the membrane-forming solvent. Less than 10% by mass of the polyethylene resin content undesirably causes decrease in low productivity. In addition, large swelling and neck-in occur at the die exit in the extrusion of the resin solutions A and B, resulting in decrease in the formability and self-supportability of the multi-layer, gel-like molding. More than 50% by mass of the polyethylene resin content deteriorates the formability of the multi-layer, gel-like molding.

Different resin concentrations between the resin solutions A and B provide a multi-layer, microporous membrane with a structure in which the average pore diameter changes in a thickness direction (gradient structure). A layer formed by using a resin solution having a lower concentration has a larger average pore diameter than that of a layer formed by using a resin solution having a higher concentration. Which resin solution A or B has a higher concentration can be properly selected depending on properties required on the multi-layer, microporous membrane. The resin concentration difference between the resin solutions A and B is preferably 5% or more by mass, more preferably 10% or more by mass.

(2) Extrusion

The resin solutions A and B supplied from separate extruders are simultaneously extruded from a die. In the simultaneous extrusion of the resin solutions A and B, in which both solutions are combined in a laminar manner in one die and extruded in a sheet form (bonding inside the die), pluralities of extruders are connected to one die. Alternatively, when both solutions are extruded in a sheet form from separate dies and then laminated (bonding outside the die), each extruder is connected to each die. Bonding inside the die is preferable.

In the simultaneous extrusion, either a flat die method or an inflation method can be used. To achieve bonding inside the die in either method, a method of supplying the solutions to separate manifolds connected to a multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed description will be omitted. A known flat or inflation die can be used to form a multi-layer membrane. The multi-layer-forming flat die preferably has a gap of 0.1 to 5 mm. When bonding is conducted outside the die by the flat die method, sheet-shaped solutions extruded through each die can be laminated under pressure between a pair of rolls. In any methods described above, the die is heated at a temperature of 140 to 250° C. during extrusion. The extrusion speed of the heated solution is preferably 0.2 to 15 m/minute. The adjustment of the amount of each resin solution A, B extruded can determine a ratio of the microporous layer A to the microporous layer B.

(3) Formation of gel-Like laminate sheet

The resultant laminate extrudate is cooled to provide a gel-like sheet. The cooling is preferably conducted to at least a gelation temperature at a speed of 50° C./minute or more. Such cooling provides a fixed microphase separation between the polyethylene resins A and B caused by the membrane-forming solvent. The cooling is preferably conducted to 25° C. or lower. In general, a low cooling speed provides the gel-like laminate sheet with a coarse high-order structure having large pseudo-cell units, while a high cooling speed provides dense cell units. The cooling speed of less than 50° C./minute increases crystallization, making it difficult to form a stretchable gel-like sheet. The cooling method can be a method of bringing the extrudate into contact with a cooling medium such as a cooling air, a cooling water, etc., a method of bring the extrudate into contact with a cooling roll, etc.

(4) Removal of membrane-forming solvent

The membrane-forming solvent is removed (washed away) using a washing solvent. Because the phases of the polyethylene resins A and B are separated from the membrane-forming solvent phase, the removal of the membrane-forming solvent provides a microporous membrane. The removal (washing away) of the liquid solvent can be conducted by using known washing solvents. The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a multi-layer, microporous membrane having high porosity and permeability.

The washing of the gel-like laminate sheet can be conducted by a washing-solvent-immersing method, a washing-solvent-showering method, or a combination thereof. The amount of the washing solvent used is preferably 300 to 30,000 parts by mass per 100 parts by mass of the stretched membrane. Washing with the washing solvent is preferably conducted until the amount of the remaining membrane-forming solvent becomes less than 1% by mass of that added.

(5) Drying of membrane

The multi-layer, microporous membrane obtained by removing the membrane-forming solvent is then dried by a heat-drying method, a wind-drying method, etc. The drying temperature is preferably equal to or lower than a crystal dispersion temperature Tcd, which is a lower one of the crystal dispersion temperature $Tcd_a$ of the polyethylene resin A and the crystal dispersion temperature $Tcd_b$ of the polyethylene resin B, particularly 5° C. or more lower than the crystal dispersion temperature Tcd. When the polyethylene resin A is the high-density polyethylene A or the polyethylene composition A, the crystal dispersion temperature $Tcd_a$ of the polyethylene resin A is crystal dispersion temperature thereof. When the polyethylene resin A is the polyolefin composition A or the heat-resistant polyethylene resin composition A, the crystal dispersion temperature $Tcd_a$ of the polyethylene resin A is a crystal dispersion temperature of the high-density polyethylene A or the polyethylene composition A contained in the polyolefin composition A or the heat-resistant polyethylene resin composition A. When the polyethylene resin B is the high-density polyethylene B or the polyethylene composition B, the crystal dispersion temperature $Tcd_b$ of the polyethylene resin B is a crystal dispersion temperature thereof. When the polyethylene resin B is the polyolefin composition B or the heat-resistant polyethylene resin composition B, the crystal dispersion temperature $Tcd_b$ of the polyethylene resin B is a crystal dispersion temperature of the high-density polyethylene B or the polyethylene composition B contained in the polyolefin composition B or the heat-resistant polyethylene resin composition B. The crystal dispersion temperature is determined by measuring the temperature properties of dynamic viscoelasticity according to ASTM D 4065. The high-density polyethylenes A and B, and the polyethylene compositions A and B have crystal dispersion temperatures in a range of about 90 to 100° C.

Drying is conducted until the percentage of the remaining washing solvent becomes preferably 5% or less by mass, more preferably 3% or less by mass, based on 100% by mass of the multi-layer, microporous membrane (dry weight). Insufficient drying undesirably reduces the porosity of the multi-layer, microporous membrane in subsequent re-stretching and heat treatment steps, thereby resulting in poor permeability.

(6) Optional steps before removal of membrane-forming solvent

Before the step (4) of removing the membrane-forming solvent, any one of a stretching step, a heat-setting step, a heat roll treatment step and a hot solvent treatment step can be conducted to the gel-like laminate sheet.

(i) Stretching

After heating, the gel-like laminate sheet is preferably stretched to a predetermined magnification by a tenter method, a roll method, an inflation method, a rolling method, or their combination. Because gel-like laminate sheet contains a membrane-forming solvent, it can be uniformly stretched. Because the stretching improves the mechanical strength and expands pores, it is preferable particularly for use as battery separators. Although the stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is preferable.

The stretching magnification is preferably 2-fold or more, more preferably 3- to 30-fold in the case of monoaxial stretching. In the case of biaxial stretching, it is at least 3-fold in both directions, with an area magnification of preferably 9-fold or more, more preferably 25-fold or more. The area magnification of less than 9-fold results in insufficient stretching, failing to providing a high-modulus, high-strength microporous membrane. When the area magnification is more than 400-fold, restrictions occur on stretching apparatuses, stretching operations, etc.

The stretching temperature is preferably equal to or lower than a melting point Tm+10° C., more preferably in a range of the crystal dispersion temperature Tcd or higher and lower than the melting point Tm, the melting point Tm being a lower one of the melting point $Tm_a$ of the polyethylene resin A and the melting point $Tm_b$ of the polyethylene resin B. When this stretching temperature exceeds the melting point Tm+10° C., the resin is molten, so that stretching fails to orient molecular chains. When it is lower than the crystal dispersion temperature Tcd, the resin is insufficiently softened, making it likely that the membrane is broken by stretching, thus failing to achieve high-magnification stretching. As described above, the high-density polyethylenes A and B, and the polyethylene compositions A and B have crystal dispersion temperatures of about 90 to 100° C. Accordingly, the stretching temperature is usually in a range of 90 to 140° C., preferably in a range of 100 to 130° C.

The above stretching causes cleavage between polyethylene crystal lamellas, making the polyethylene phases (high-density polyethylene A phase or polyethylene composition A phase, and high-density polyethylene B phase or polyethylene composition B phase) finer with larger numbers of fibrils. The fibrils form a three-dimensional network structure (three-dimensionally and irregularly connected network structure). In a layer containing the heat-resistant polyethylene resin composition, fibrils are cleft with fine, heat-resistant resin particles as nuclei, thereby forming craze-like pores holding fine particles in the center.

Depending on the desired properties, stretching can be conducted with a temperature distribution in a thickness direction, to provide a multi-layer, microporous membrane with higher mechanical strength. Particularly when stretching is conducted with such a temperature distribution that the temperature is higher on at least one surface than in the membrane, pore size are larger on the high-temperature surface side. Enlarged pores improve the cyclability and electrolytic solution absorbability of the microporous membrane. This method is described specifically in Japanese Patent 3347854.

(ii) Heat-setting

The gel-like laminate sheet can be heat-set. The heat-setting can change the pore size and porosity of the multi-layer, microporous membrane. The heat-setting is conducted by a tenter method, a roll method or a rolling method. The heat-setting is conducted in a temperature range of the melting point Tm+10° C. or lower, preferably from the crystal dispersion temperature Tcd to the melting point Tm.

(iii) Hot roll treatment

At least one surface of the gel-like laminate sheet can be brought into contact with a heat roll (heat roll treatment), to enlarge the pore diameter near the surface. The pore diameter near the surface and the thickness of a layer having enlarged pore diameter can be controlled by adjusting the roll temperature, the contact time of the membrane with the roll, the contact area ratio of the membrane with the roll, etc.

The roll temperature is preferably in a range of the crystal dispersion temperature Tcd+10° C. or higher and lower than the melting point Tm. The heat roll treatment is preferably conducted on the stretched gel-like laminate sheet. The heat-stretched gel-like laminate sheet is preferably cooled to a temperature lower than the crystal dispersion temperature Tcd before contact with the heat roll.

The roll can have a flat or rough surface. A flat roll can be a rubber or metal roll. The heat roll can have a function of sucking the gel-like sheet. When the gel-like laminate sheet comes into contact with the heat roll having a heating oil on the surface, high heating efficiency is achieved, and the resultant membrane is provided with a larger average pore diameter near the surface. The heating oil can be the same as the membrane-forming solvent. The use of a suction roll can control the amount of the heating oil kept on the roll.

(iv) Hot solvent treatment

The gel-like laminate sheet can be treated with a hot solvent. The hot solvent treatment enlarges the diameters of near-surface pores of the multi-layer, microporous membrane. The hot solvent treatment is preferably conducted on the stretched, gel-like laminate sheet. Solvents usable for the heat treatment are preferably the above liquid membrane-forming solvents, more preferably liquid paraffin. The heat treatment solvents can be the same as or different from the membrane-forming solvent used for producing the resin solution A or B.

The hot solvent treatment method is not particularly critical as long as the gel-like laminate sheet comes into contact with a hot solvent. It includes, for instance, a method of directly contacting the gel-like laminate sheet with a hot solvent (simply called "direct method" unless otherwise mentioned), a method of contacting the gel-like laminate sheet with a cold solvent and then heating it (simply called, "indirect method" unless otherwise mentioned), etc. The direct method includes a method of immersing the gel-like laminate sheet in a hot solvent, a method of spraying a hot solvent to the gel-like laminate sheet, a method of coating the gel-like laminate sheet with a hot solvent, etc., and the immersing method is preferable. In the indirect method, the gel-like laminate sheet is immersed in a cold solvent, sprayed with a cold solvent, or coated with a cold solvent, and then brought into contact with a heat roll, heated in an oven, or immersed in a hot solvent.

With the temperature and time properly varied in the hot solvent treatment step, the pore size and porosity of the multi-layer, microporous membrane can be changed. The hot solvent temperature is preferably in a range from the crystal dispersion temperature Tcd to the melting point Tm+10° C. Specifically, the hot solvent temperature is preferably 110 to 140° C., more preferably 115 to 135° C. The contact time is preferably 0.1 seconds to 10 minutes, more preferably 1 second to 1 minute. When the hot solvent temperature is lower than the crystal dispersion temperature Tcd, or when the contact time is shorter than 0.1 seconds, the hot solvent treatment is substantially not effective, failing to improve permeability. On the other hand, when the hot solvent temperature is higher than the melting point Tm+10° C., or when the contact time is more than 10 minutes, the multi-layer, microporous membrane loses strength or ruptures.

With such hot solvent treatment, fibrils formed by stretching have a leaf-vein-like structure, in which trunk-forming fibers are relatively thick. Accordingly, the microporous membrane having a large pore size and excellent strength and permeability can be obtained. The term "leaf-vein-like fibrils" means that the fibrils have thick trunks and fine fibers spreading from the trunks, forming a complex network structure.

Although the remaining heat treatment solvent is removed by washing after the hot solvent treatment, it can be removed together with the membrane-forming solvent.

(7) Optional steps after drying step After the drying step (5), a re-stretching step, a heat treatment step, a hot solvent treatment step, a cross-linking step with ionizing radiations, a hydrophilizing step, a surface-coating step, etc. can be conducted.

(i) Re-stretching

A multi-layer, microporous membrane obtained by washing and drying the stretched, gel-like laminate sheet can be stretched again in at least one direction. The re-stretching can be conducted by the same tenter method as described above, etc. while heating the membrane. The re-stretching can be monoaxial or biaxial. The biaxial stretching can be simultaneous biaxial stretching or sequential stretching, though the simultaneous biaxial stretching is preferable.

The re-stretching temperature is preferably equal to or lower than the melting point Tm, more preferably in a range from the crystal dispersion temperature Tcd to the melting point Tm. When the re-stretching temperature exceeds the melting point Tm, the compression resistance is lowered, and there is large unevenness in properties (particularly air permeability) in a width direction when stretched in a transverse direction (TD). When the re-stretching temperature is lower than the crystal dispersion temperature Tcd, the polyethylene resins A and B are insufficiently softened, making it likely that the membrane is broken by stretching, thus failing to achieve uniform stretching. Specifically, the re-stretching temperature is usually in a range of 90 to 135° C., preferably in a range of 95 to 130° C.

The re-stretching magnification in one direction is preferably 1.1 to 2.5-fold, to provide the multi-layer, microporous membrane with increased pore diameter and improved compression resistance. In the case of monoaxial stretching, for instance, it is 1.1- to 2.5-fold in MD or TD. In the case of biaxial stretching, it is 1.1- to 2.5-fold in both MD and TD. As long as the stretching magnification is 1.1- to 2.5-fold in each of MD and TD in biaxial stretching, the stretching magnifications in MD and TD can be different, but are preferably the same. When this magnification is less than 1.1-fold, sufficiently improved compression resistance cannot be obtained. When this magnification is more than 2.5-fold, the membrane is highly likely broken, and undesirably suffers decreased heat shrinkage resistance. The re-stretching magnification is more preferably 1.1- to 2.0-fold.

(ii) Heat treatment

The dried membrane is preferably heat-treated. The heat treatment stabilizes crystals and makes lamellas uniform. The heat treatment can be heat setting and/or annealing. The heat-setting treatment can be the same as described above.

The annealing can be conducted using a belt conveyer or an air-floating furnace in addition to the tenter method, the roll method or the rolling method. The annealing is conducted at a temperature equal to or lower than the melting point Tm, preferably at a temperature in a range from 60° C. to the melting point Tm−10° C. Such annealing provides a high-strength, multi-layer, microporous membrane with good permeability. The heat-setting and the annealing can be combined.

(iii) Hot solvent treatment

The dried membrane can be treated with a hot solvent. The hot solvent treatment can be the same as described above.

(iv) Cross-linking of membrane

The dried, multi-layer, microporous membrane can be cross-linked by ionizing radiation of α-rays, α-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous membrane.

(v) Hydrophilizing

The dried, multi-layer, microporous membrane can be hydrophilized. The hydrophilizing treatment can be a monomer-grafting treatment, a surfactant treatment, a corona-discharging treatment, etc. The monomer-grafting treatment is preferably conducted after cross-linking.

In case of the surfactant treatment, any of nonionic surfactants, cationic surfactants, anionic surfactants and amphoteric surfactants can be used, but the nonionic surfactants are preferable. The multi-layer, microporous membrane is dipped in a solution of the surfactant in water or a lower alcohol such as methanol, ethanol, isopropyl alcohol, etc., or coated with the solution by a doctor blade method.

(vi) Surface-coating

The dried multi-layer, microporous membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000, and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The coating layer can be formed, for instance, by coating the multi-layer, microporous membrane with a mixed solution containing the above coating resin and its good solvent, removing the good solvent to increase the concentration of the resin, thereby forming a structure in which a resin phase is separated from a go4od solvent phase, and removing the remaining good solvent.

(b) Second production method

The second production method comprises the steps of (1) preparing the above resin solutions A and B, (2) extruding the resin solutions A and B from separate dies, (3) cooling the extrudates A and B to provide gel-like sheets A and B, (4) removing the membrane-forming solvent from the gel-like sheets A and B to form microporous polyethylene membranes A and B, (5) drying the microporous polyethylene membranes A and B, and (6) laminating them. Before the step (4), if necessary, a step of stretching the gel-like sheets A and B, a heat-setting step, a heat roll treatment step and a hot solvent treatment step can be conducted. Further, after the laminating step (6), a re-stretching step, a heat treatment step, a hot solvent treatment step, a cross-linking step, a hydrophilizing step, a surface-coating step, etc. can be conducted.

Among the above steps, the step (1) can be the same as in the first method, the step (2) can be the same as in the first method except for extruding the resin solutions A and B through separate dies, the step (3) can be the same as in the first method except for forming separate gel-like sheets A and B, the step (4) can be the same as in the first method except for removing the membrane-forming solvent from separate gel-like sheets A and B, and the step (5) can be the same as in the first method except for drying separate microporous polyethylene membranes A and B. It should be noted that in the step (5), the drying temperatures of the microporous membranes A and B are preferably equal to or lower than the crystal dispersion temperatures $Tcd_a$ and $Tcd_b$, respectively. The drying temperatures are more preferably lower than the crystal dispersion temperatures $Tcd_a$ and $Tcd_b$ by 5° C. or more.

The stretching step, the heat-setting step, the heat roll treatment step and the hot solvent treatment step before the step (4) can be the same as in the first method except that they are conducted on the gel-like sheet A or B. However, when the gel-like sheet A is stretched before the step (4), the stretching temperature is preferably in a range of the melting point $Tm_a+10°$ C. or lower, more preferably in a range of the crystal dispersion temperature $Tcd_a$ or higher and lower than the melting point $Tm_a$. When the gel-like sheet B is stretched, the stretching temperature is preferably in a range of the melting point $Tm_b+10°$ C. or lower, more preferably in a range of the crystal dispersion temperature $Tcd_b$ or higher and lower than the melting point $Tm_b$.

When the gel-like sheet A is heat-set before the step (4), the heat-setting temperature is preferably in a range of the melting point $Tm_a+10°$ C. or lower, more preferably in a range from the crystal dispersion temperature $Tcd_a$ to the melting point $Tm_a$. When the gel-like sheet B is heat-set, the heat-setting temperature is preferably in a range of the melting point $Tm_b+10°$ C. or lower, more preferably in a range from the crystal dispersion temperature $Tcd_b$ to the melting point $Tm_b$.

When the gel-like sheet A is subjected to a heat roll treatment before the step (4), the roll temperature is preferably in a range of the crystal dispersion temperature $Tcd_a+10°$ C. or higher and lower than the melting point $Tm_a$. When the gel-like sheet B is treated, the roll temperature is more preferably in a range of the crystal dispersion temperature $Tcd_b+10°$ C. or higher and lower than the melting point $Tm_b$.

When the gel-like sheet A is subjected to a hot solvent treatment before the step (4), the hot solvent temperature is preferably in a range from the crystal dispersion temperature $Tcd_a$ to the melting point $Tm_a+10°$ C. When the gel-like sheet B is treated, the hot solvent temperature is preferably in a range from the crystal dispersion temperature $Tcd_b$ to the melting point $Tm_b+10°$ C.

The step (6) of alternately laminating the microporous polyethylene membranes A and B will be described below. Though not particularly critical, the laminating method is preferably a heat-laminating method. The heat-laminating method includes a heat-sealing method, an impulse-sealing method, an ultrasonic laminating method, etc., and the heat-sealing method is preferable. The heat-sealing method preferably uses a heat roll. In the heat roll method, the overlapped microporous polyethylene membranes A and B are heat-sealed by passing through a pair of heat rolls or between a heat roll and a table. The heat-sealing temperature and pressure are not particularly critical, as long as the microporous polyethylene membranes are sufficiently bonded, and unless the resultant microporous membrane has low properties. The heat-sealing temperature is, for instance, 90 to 135° C., preferably 90 to 115° C. The heat-sealing pressure is preferably 0.01 to 50 MPa. The ratio of the microporous layer A to the microporous layer B can be controlled by adjusting the thickness of the microporous polyethylene membranes A and B.

The re-stretching step, the heat treatment step, the hot solvent treatment step, the cross-linking step, the hydrophilizing step and the surface-coating step after the step (6) can be the same as in the first method.

[5] Structure and properties of multi-layer, microporous polyethylene membrane

The multi-layer, microporous polyethylene membrane of this invention comprises microporous layers A and B. Having the microporous layer A comprising the high-density polyethylene A, the multi-layer, microporous polyethylene membrane has excellent shutdown properties. Having the microporous layer B comprising the high-density polyethylene B, the multi-layer, microporous polyethylene membrane has excellent high permeability, mechanical strength and oxidation resistance.

The number of layers in the multi-layer, microporous membrane is not particularly critical. With three or more layers, the curl of the multi-layer, microporous membrane is preferably suppressed. Combinations of the microporous layers A and B are also not particularly critical. For instance, the combinations of the microporous layers can be A/B, A/B/A, B/A/B, etc. For instance, when the multi-layer, microporous membrane used as a battery separator has a structure comprising both surface layers each constituted by the microporous layer A, and an inner layer constituted by the microporous layer B (A/B/A structure), it has particularly an improved balance of shutdown properties, high permeability and mechanical strength.

The thickness ratio of the microporous layers A and B is not particularly critical, but can be determined depending on properties required for the multi-layer, microporous membrane. When used as a battery separator, the area ratio of the microporous layer B to the microporous layer A in a membrane cross section is preferably 0.1 to 1.2. When this ratio is less than 0.1, the multi-layer, microporous membrane has low permeability and mechanical strength. When this ratio is more than 1.2, the multi-layer, microporous membrane has low shutdown properties.

With the resin concentration difference between the resin solutions A and B as described above, the resultant multi-layer, microporous membrane has a structure in which the average pore diameter changes in a thickness direction, namely a gradient structure comprising a coarse-structure layer having a larger average pore diameter and a dense-structure layer having a smaller average pore diameter. When the multi-layer, microporous membrane having the gradient structure is used as a battery separator, the coarse-structure layer follows the expansion and shrinkage of electrodes while keeping permeability, and the dense-structure layer prevents short-circuiting between electrodes. As a result, the multi-layer, microporous membrane suffers only small air permeability change when compressed. Having the coarse-structure layer having a large average pore diameter, the multi-layer, microporous membrane has improved cyclability and electrolytic solution absorbability.

The shape of penetrating pores in the multi-layer, microporous membrane having the gradient structure is not particularly critical. A two-layer, microporous membrane (layer structure: A/B), for instance, can have tapered penetrating pores having large openings on one surface and gradually decreasing in size toward the opposite surface. A three-layer microporous membrane, for instance, can have penetrating pores whose sizes are gradually decreasing from both surfaces toward the center of the membrane.

The multi-layer, microporous polyethylene membrane according to a preferred embodiment of this invention has the following properties.

(a) Porosity of 25 to 80%

With the porosity of less than 25%, the multi-layer, microporous membrane does not have good air permeability. When the porosity exceeds 80%, the multi-layer, microporous membrane used as a battery separator does not have enough strength, resulting in a high likelihood of short-circuiting between electrodes.

(b) Air permeability of 20 to 500 seconds/100 cm$^3$ (converted to value at 20-µm thickness)

When the air permeability is in a range from 20 to 500 seconds/100 cm$^3$, batteries having separators formed by the multi-layer, microporous membrane have large capacity and good cyclability. When the air permeability exceeds 500 seconds/100 cm$^3$, the batteries have small capacity. On the other hand, when the air permeability is less than 20 seconds/100 cm$^3$, shutdown does not fully occur when the temperature is elevated in the batteries.

(c) Pin puncture strength of 3,500 mN/20 µm or more

With the pin puncture strength of less than 3,500 mN/20 µm, a battery comprising the multi-layer, microporous membrane as a separator likely suffers short-circuiting between electrodes.

(d) Tensile rupture strength of 70,000 kPa or more

With the tensile rupture strength of 70,000 kPa or more in both longitudinal direction (MD) and transverse direction (TD), the membrane is unlikely ruptured when used as a battery separator.

(e) Tensile rupture elongation of 100% or more

With the tensile rupture elongation of 100% or more in both longitudinal direction (MD) and transverse direction (TD), the battery separator formed by the membrane is unlikely ruptured.

(f) Heat shrinkage ratio of 10% or less

The heat shrinkage ratio is 10% in both longitudinal direction (MD) and transverse direction (TD) after exposed to 105° C. for 8 hours. When used for battery separators, the heat shrinkage ratio is preferably 7% or less.

(g) Shutdown temperature of 140° C. or lower

When the shutdown temperature exceeds 140° C., a lithium battery separator formed by the multi-layer, microporous membrane has low shutdown response when overheated.

(h) Meltdown temperature of 160° C. or higher

The meltdown temperature is preferably 160 to 190° C.

(i) Shutdown speed of 2,000 sec/100 cm$^3$/20 µm or more

When the shutdown speed expressed by air permeability (Gurley value) measured after a multi-layer, microporous membrane sample is in contact with a hot plate controlled at 135° C. for 10 seconds is less than 2,000 sec/100 cm$^3$/20 µm, a lithium battery separator formed by the multi-layer, microporous membrane has slow shutdown response when overheated.

(j) Voltage drop resistance (oxidation resistance) of 0.3V or less

When voltage drop measured after a lithium ions battery comprising a separator formed by the multi-layer, microporous membrane is charged to 4.2 V and left to stand at 60° C. for 2 days is more than 0.3 V, the multi-layer, microporous membrane has low oxidation resistance, resulting in batteries with low storability.

[6] Battery separator

The thickness of the battery separator formed by the above multi-layer, microporous polyethylene membrane is preferably 3 to 200 µm, more preferably 5 to 50 µm, though properly selected depending on the types of batteries.

[7] Battery

The microporous polyethylene membrane of this invention can be used preferably as a separator for secondary batteries such as lithium secondary batteries, lithium polymer secondary batteries, nickel-hydrogen batteries, nickel-cadmium batteries, nickel-zinc batteries, silver-zinc batteries, etc., particularly as a separator for lithium secondary batteries. Taking the lithium secondary battery for example, description will be made below.

The lithium secondary battery comprises a cathode and an anode laminated via a separator, the separator containing an electrolytic solution (electrolyte). The electrode can be of any known structure, not particularly critical. The electrode structure can be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises (a) a current collector, and (b) a cathodic active material layer capable of absorbing and discharging lithium ions, which is formed on the current collector. The cathodic active materials can be inorganic compounds such as transition metal oxides, composite oxides of lithium and transition metals (lithium composite oxides), transition metal sulfides, etc. The transition metals can be V, Mn, Fe, Co, Ni, etc. Preferred examples of the lithium composite oxides are lithium nickelate, lithium cobaltate, lithium manganate, laminar lithium composite oxides having an α-NaFeO$_2$ structure, etc. The anode comprises (a) a current collector, and (b) an anodic active material layer formed on the current collector. The anodic active materials can be carbonaceous materials such as natural graphite, artificial graphite, cokes, carbon black, etc.

The electrolytic solutions can be obtained by dissolving lithium salts in organic solvents. The lithium salts can be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts can be used alone or in combination. The organic solvents can be organic solvents having high boiling points and high dielectric constants such as ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents can be used alone or in combination. Because organic solvents having high dielectric constants have high viscosity, while those having low viscosity have low dielectric constants, their mixtures are preferably used.

When the battery is assembled, the separator can be impregnated with the electrolytic solution, so that the separator (multi-layer, microporous polyethylene membrane) is provided with ion permeability. The impregnation treatment can be (and usually is) conducted by immersing the multi-layer, microporous membrane in the electrolytic solution at room temperature. When a cylindrical battery is assembled, for instance, a cathode sheet, a separator formed by the multi-layer, microporous membrane, and an anode sheet are laminated in this order, and the resultant laminate is wound to a toroidal-type electrode assembly. The resulting electrode assembly can be charged into a battery can and impregnated with the above electrolytic solution. The resulting electrode assembly can be charged into a battery can and impregnated with the above electrolytic solution. A battery lid acting as a cathode terminal equipped with a safety valve can be caulked to the battery can via a gasket to produce a battery.

This invention will be described in more detail with reference to Examples below without intention of restricting the scope of this invention.

EXAMPLE 1

(1) Preparation of polyethylene resin solution A

Dry-blended were 100 parts by mass of a polyethylene (PE) composition A comprising 30% by mass of ultra-high-molecular-weight polyethylene (UHMWPE) having a mass-average molecular weight (Mw) of $2.0 \times 10^6$, and 70% by mass of high-density polyethylene A (HDPE-A) having Mw of $3.5 \times 10^5$, Mw/Mn of 13.5, and a terminal vinyl group concentration of 0.9/10,000 C, with 0.2 parts by mass of tetrakis [methylene-3-(3,5-ditertiary-butyl-4-hydroxyphenyl)-propionate] methane as an antioxidant. Measurement revealed that the polyethylene (PE) composition A comprising UHMWPE and HDPE-A had a melting point of 135° C., a crystal dispersion temperature of 100° C., Mw of $8.4 \times 10^5$, and Mw/Mn of 24.0.

The Mws and Mw/Mn ratios of the UHMWPE, the HDPE and the PE composition were measured by gel permeation chromatography (GPC) under the following conditions (hereinafter, the same conditions applied to the examples below).

Measurement apparatus: GPC-15° C. available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 µl,
Detector: Differential Refractometer (RI detector) available from Waters Corp., and
Calibration curve: Produced from a calibration curve of a single-dispersion, standard polystyrene sample using a predetermined conversion constant.

30 parts by mass of the resultant mixture was charged into a strong-blending, double-screw extruder having an inner diameter of 58 mm and L/D of 42, 70 parts by mass of liquid paraffin [35 cSt (40° C.)] was supplied to the double-screw extruder via its side feeder, and melt-blending was conducted at 230° C. and 250 rpm to prepare a resin solution A.

(2) Preparation of polyethylene resin solution B

A PE composition B (melting point: 135° C., crystal dispersion temperature: 100° C., Mw: $6.4 \times 10^5$, and Mw/Mn: 15.2) comprising 20% by mass of UHMWPE, and 80% by mass of high-density polyethylene B (HDPE-B) having Mw of $3.0 \times 10^5$, Mw/Mn of 8.6 and a terminal vinyl group concentration of 0.1/10,000 C was dry-blended with the antioxidant in the same manner as above. Using the resultant mixture, a polyethylene resin solution B was prepared in the same manner as above except that the resin concentration was 20% by mass.

(3) Formation of membrane

The polyethylene resin solutions A and B were supplied from separate double-screw extruders to a two-layer-forming T-die, and extruded through the T-die at a layer thickness ratio A/B of 2/1. The extrudate was cooled by drawing by a cooling roll controlled at 0° C., thereby obtaining a two-layer, gel-like sheet. Using a tenter-stretching machine, the two-layer, gel-like sheet was simultaneously and biaxially stretched to 5-fold in both longitudinal direction (MD) and transverse direction (TD) at 115° C. Fixed to an aluminum frame plate of 20 cm×20 cm, the stretched two-layer, gel-like sheet was immersed in a washing bath of methylene chloride controlled at 25° C., and washed with the vibration of 100 rpm for 3 minutes to remove the liquid paraffin. The washed membrane was air-dried at room temperature, and fixed to the tenter to conduct a heat-setting treatment at 127° C. for 10 minutes, thereby producing a two-layer, microporous polyethylene membrane.

EXAMPLE 2

(1) Preparation of polyethylene resin solution A

A PE composition A (melting point: 135° C., crystal dispersion temperature: 100° C., Mw: $6.8 \times 10^5$, and Mw/Mn: 21.5) comprising 20% by mass of UHMWPE and 80% by mass of HDPE-A was dry-blended with the antioxidant in the same manner as in Example 1. Using the resultant mixture, a polyethylene resin solution A was prepared in the same manner as in Example 1, except that the resin concentration was 20% by mass.

(2) Preparation of polyethylene resin solution B

A PE composition B (melting point: 135° C., crystal dispersion temperature: 100° C., Mw: $8.5 \times 10^5$, and Mw/Mn: 17.2) comprising 30% by mass of UHMWPE and 70% by mass of HDPE-B was dry-blended with the antioxidant in the same manner as in Example 1. Using the resultant mixture, a polyethylene resin solution B was prepared in the same manner as in Example 1, except that the resin concentration was 30% by mass.

(3) Formation of membrane

A two-layer, gel-like sheet was produced in the same manner as in Example 1, except that the extrudate had a layer thickness ratio (solution A/solution B) of 1/1. The two-layer, gel-like sheet was simultaneously and biaxially stretched, washed and air-dried in the same manner as in Example 1. Fixed to a tenter, the resultant membrane was stretched again to 1.2-fold in TD at 128° C., and heat-set at 128° C. for 10 minutes to produce a two-layer, microporous polyethylene membrane.

EXAMPLE 3

A polyethylene resin solution A was prepared in the same manner as in Example 1, except that only HDPE-A was used as the polyethylene resin A, and that the resin concentration was 25% by mass. A polyethylene resin solution B was prepared in the same manner as in Example 1, except that only HDPE-B was used as the polyethylene resin B, and that the resin concentration was 40% by mass. A two-layer, gel-like sheet was produced in the same manner as in Example 1, except that the extrudate had a layer thickness ratio (solution A/solution B) of 1/1. Using this two-layer, gel-like sheet, a two-layer, microporous polyethylene membrane was produced in the same manner as in Example 1, except that simultaneous biaxial stretching was conducted at a temperature of 116° C., that stretching was conducted again to 1.2-fold in TD at 128.5° C. after washing and air-drying, and that the heat-setting temperature was 128.5° C.

EXAMPLE 4

(1) Preparation of polyethylene resin solution A

A PE composition A (melting point: 135° C., crystal dispersion temperature: 100° C., Mw: $9.3 \times 10^5$, and Mw/Mn: 24.5) comprising 35% by mass of UHMWPE and 65% by mass of HDPE-A was dry-blended with the antioxidant in the same manner as in Example 1. Using the resultant mixture, a polyethylene resin solution A was prepared in the same manner as in Example 1, except that the resin concentration was 40% by mass.

(2) Preparation of polyethylene resin solution B

A PE composition B (melting point: 135° C., crystal dispersion temperature: 100° C., Mw: $5.9 \times 10^5$, and Mw/Mn: 14.7) comprising 18% by mass of UHMWPE and 82% by mass of HDPE-B was dry-blended with the antioxidant in the same manner as in Example 1. Using the resultant mixture, a polyethylene resin solution B was prepared in the same manner as in Example 1, except that the resin concentration was 15% by mass.

(3) Formation of membrane

The polyethylene resin solutions A and B were supplied from separate double-screw extruders to a three-layer-forming T-die, and extruded from the T-die to form a laminate extrudate comprising the solution A, the solution B and the solution A in this order at a layer thickness ratio A/B/A of 2/1/2. The extrudate was cooled while drawing by a cooling roll controlled at 0° C., thereby providing a three-layer, gel-like sheet. The three-layer, gel-like sheet was simultaneously and biaxially stretched, washed, and air-dried in the same manner as in Example 1. Fixed to a tenter, the resultant membrane was stretched again to 1.4-fold in TD at 128.5° C., and heat-set at 128.5° C. for 10 minutes to produce a three-layer microporous polyethylene membrane.

EXAMPLE 5

(1) Production of microporous polyethylene membrane A

A PE composition A (melting point: 135° C., crystal dispersion temperature: 100° C., Mw: $4.6 \times 10^5$, and Mw/Mn: 15.9) comprising 5% by mass of UHMWPE and 95% by mass of HDPE-A was dry-blended with the antioxidant in the same manner as in Example 1. Using the resultant mixture, a polyethylene resin solution A was prepared in the same manner as in Example 1, except that the resin concentration was 40% by mass. The polyethylene resin solution A was extruded from a T-die attached to a tip end of the double-screw extruder, and cooled while drawing by a cooling roll controlled at 0° C., thereby providing a gel-like sheet A. The gel-like sheet A was simultaneously and biaxially stretched, washed, and air-dried in the same manner as in Example 1 to produce a microporous polyethylene membrane A.

(2) Production of microporous polyethylene membrane B

A PE composition B (melting point: 135° C., crystal dispersion temperature: 100° C., Mw: $3.8 \times 10^5$, and Mw/Mn: 11.0) comprising 5% by mass of UHMWPE and 95% by mass of HDPE-B was dry-blended with the antioxidant in the same manner as in Example 1. Using the resultant mixture, a polyethylene resin solution B having a resin concentration of 20% by mass was prepared in the same manner as in Example 1. A microporous polyethylene membrane B was produced from the polyethylene resin solution B in the same manner as in the above microporous membrane A.

(3) Lamination and heat-setting

The microporous polyethylene membranes A and B were laminated by passing through a pair of rolls at a temperature of 130° C. and a pressure of 0.05 MPa. The resultant laminate membrane was heat-set at 130° C. for 10 minutes to produce a two-layer, microporous polyethylene membrane having a layer thickness ratio (membrane A/membrane B) of 1/1.

COMPARATIVE EXAMPLE 1

Using the same PE composition A as in Example 2, a polyethylene resin solution A was prepared in the same manner as in Example 1, except that the resin concentration was 30% by mass. The polyethylene resin solution A was extruded from a T-die attached to a tip end of the double-screw extruder, and cooled while drawing by a cooling roll controlled at 0° C., thereby providing a gel-like sheet. The gel-like sheet was simultaneously and biaxially stretched, washed, and air-dried in the same manner as in Example 1. Fixed to a tenter, the resultant membrane was heat-set at 125° C. for 10 minutes to produce a microporous polyethylene membrane.

COMPARATIVE EXAMPLE 2

Using the same PE composition B as in Example 1, a polyethylene resin solution B was prepared in the same manner as in Example 1, except that the resin concentration was 30% by mass. Using the polyethylene resin solution B, a microporous polyethylene membrane was produced in the same manner as in Comparative Example 1 except that the heat-setting temperature was 128° C.

COMPARATIVE EXAMPLE 3

Using a PE composition (melting point: 135° C., crystal dispersion temperature: 100° C., Mw: $9.9 \times 10^5$, and Mw/Mn: 22.7) comprising 40% by mass of UHMWPE, 30% by mass of HDPE-A and 30% by mass of HDPE-B, a polyethylene resin solution was prepared in the same manner as in Example 1, except that the resin concentration was 25% by mass. Using this polyethylene resin solution, a microporous polyethylene membrane was produced in the same manner as in Comparative Example 1, except that the simultaneous, biaxial stretching temperature was 116° C., and that heat-setting temperature was 127° C.

The properties of the (multi-layer) microporous polyethylene membranes obtained in Examples 1 to 5 and Comparative Examples 1 to 3 were measured by the following methods. The results are shown in Table 1.

(1) Average thickness (μm)

The thickness of the (multi-layer) microporous membrane was measured at a 5-mm longitudinal interval over a width of 30 cm by a contact thickness meter, and the measured thickness was averaged.

(2) Air permeability (sec/100 cm³/20 μm)

The air permeability $P_1$ of the (multi-layer) microporous membrane having a thickness $T_1$ was measured according to JIS P8117, and converted to air permeability $P_2$ at a thickness of 20 μm by the formula of $P_2=(P_1\times20)/T_1$.

(3) Porosity (%)

It was measured by a mass method.

(4) Pin puncture strength (mN/20 μm)

The maximum load was measured when a (multi-layer) microporous membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1\times20)/T_1$, which was regarded as pin puncture strength.

(5) Tensile rupture strength and tensile rupture elongation

They were measured using a 10-mm-wide rectangular test piece according to ASTM D882.

(6) Heat Shrinkage ratio (%)

The shrinkage ratio of the (multi-layer) microporous membrane after exposed to 105° C. for 8 hours was measured three times in both longitudinal direction (MD) and transverse direction (TD) and averaged.

(7) Shutdown temperature

Using a thermomechanical analyzer (TMA/SS6000 available from Seiko Instruments, Inc.), a test piece of 10 mm (TD)×3 mm (MD) was heated at a speed of 5° C./minute from room temperature while being longitudinally drawn under a load of 2 g. A temperature at an inflection point observed near the melting point was regarded as a shutdown temperature.

(8) Meltdown temperature (° C.)

Using the above thermomechanical analyzer, a test piece of 10 mm (TD)×3 mm (MD) was heated at a speed of 5° C./minute from room temperature while being longitudinally drawn under a load of 2 g, to measure a temperature at which the test piece was ruptured by melting.

(9) Shutdown speed

A (multi-layer) microporous membrane sample was kept in contact with a plate controlled at 135° C. for 10 seconds to measure its air permeability (sec/100 cm³/20 μm), which was used as an index of a shutdown speed.

(10) Voltage Drop Resistance (Oxidation Resistance)

An electrolytic solution of 1 M of $LiClO_4$ (lithium perchlorate) in a solvent comprising propylene carbonate (PC) and diethyl carbonate (DEC) at a PC/DEC mass ratio of 1:1 was prepared. A cathode sheet (active material: $LiCoO_2$), a separator made of a (multi-layer) microporous membrane sample, and anode sheet (active material: carbonaceous material) were laminated in this order to produce an electrode assembly. The electrode assembly was impregnated with an electrolytic solution, and sealed in two laminate films to produce a film-shaped cell. This film-shaped cell was charged to 4.2 V, left to stand at a temperature of 60° C. for 2 days to measure voltage drop (V). The smaller the voltage drop, the higher the oxidation resistance.

TABLE 1

| | Example 1 | Example 2 | Example 3 |
|---|---|---|---|
| Composition of Polyethylene Resin | | | |
| PE Composition A | | | |
| UHMWPE Mw[(1)]/% by mass | $2.0\times10^6$/30 | $2.0\times10^6$/20 | —/— |
| HDPE-A Mw[(1)]/% by mass | $3.5\times10^5$/70 | $3.5\times10^5$/80 | $3.5\times10^5$/100 |
| Terminal Vinyl Group Conc.[(2)] | 0.9 | 0.9 | 0.9 |
| Mw[(1)]/Mw/Mn[(3)] of PE Composition A | $8.4\times10^5$/24.0 | $6.8\times10^5$/21.5 | $3.5\times10^5$/13.5 |
| Tm[(4)] (° C.)/Tcd[(5)] (° C.) of PE Composition A | 135/100 | 135/100 | 135/100 |
| PE Composition B | | | |
| UHMWPE Mw[(1)]/% by mass | $2.0\times10^6$/20 | $2.0\times10^6$/30 | —/— |
| HDPE-B Mw[(1)]/% by mass | $3.0\times10^5$/80 | $3.0\times10^5$/70 | $3.0\times10^5$/100 |
| Terminal Vinyl Group Conc.[(2)] | 0.1 | 0.1 | 0.1 |
| Mw[(1)]/Mw/Mn[(3)] of PE Composition B | $6.4\times10^5$/15.2 | $8.5\times10^5$/17.2 | $3.0\times10^5$/8.6 |
| Tm[(4)] (° C.)/Tcd[(5)] (° C.) of PE Composition B | 135/100 | 135/100 | 135/100 |
| Production Conditions | | | |
| Conc. (% by mass) of PE Composition A | 30 | 20 | 25 |
| Conc. (% by mass) of PE Composition B | 20 | 30 | 40 |
| Extrudate | | | |
| Layer Structure | A/B | A/B | A/B |
| Layer Thickness Ratio | 2/1 | 1/1 | 1/1 |
| Stretching | | | |
| Gel-Like Laminate Sheet | | | |
| Temp. (° C.)/(MD × TD)[(6)] Gel-Like Sheet A | 115/5 × 5 | 115/5 × 5 | 116/5 × 5 |
| Temp. (° C.)/(MD × TD)[(6)] Gel-Like Sheet B | —/— | —/— | —/— |
| Temp. (° C.)/(MD × TD)[(6)] Lamination | —/— | —/— | —/— |
| Temp. (° C.)/Pressure (MPa) | —/— | —/— | —/— |
| Layer Structure | — | — | — |
| Layer Thickness Ratio | — | — | — |

TABLE 1-continued

| | | | |
|---|---|---|---|
| Re-Stretching | | | |
| Temp. (° C.)/Stretching Direction/Magnification | —/—/— | 128/TD/1.2 | 128.5/TD/1.2 |
| Heat-Setting | | | |
| Temp. (° C.)/Time (minute) | 127/10 | 128/10 | 128.5/10 |
| Properties of Microporous Membrane | | | |
| Average Thickness (μm) | 21.2 | 21.6 | 20.8 |
| Air Permeability (sec/100 cm$^3$/20 μm) | 265 | 278 | 244 |
| Porosity (%) | 42 | 41 | 40 |
| Pin Puncture Strength (g/20 μm, mN/20 μm) | 480/4,704 | 535/5,243 | 510/4,998 |
| Tensile Rupture Strength (kg/cm$^2$, kPa) | | | |
| MD | 1,260/123,480 | 1,180/115,640 | 1,150/112,700 |
| TD | 1,130/110,740 | 1,420/139,160 | 1,380/135,240 |
| Tensile Rupture Elongation (%)   MD/TD | 150/260 | 150/140 | 140/120 |
| Heat Shrinkage Ratio (%)   MD/TD | 5/4 | 4/5 | 3/4 |
| Thermal Properties | | | |
| SD Temperature (° C.)[7] | 132 | 140 | 140 |
| MD Temperature (° C.)[8] | 165 | 165 | 165 |
| SD Speed[9] (sec/100 cm$^3$/20 μm) | 4,228 | 3,550 | 5,912 |
| Voltage Drop (V) | 0.1 | 0.1 | 0.1 |

| | No. | | | |
|---|---|---|---|---|
| | Example 4 | Example 5 | Comp. Ex. 1 | Comp. Ex. 2 |
| Composition of Polyethylene Resin | | | | |
| PE Composition A | | | | |
| UHMWPE   Mw[1]/% by mass | 2.0 × 10$^6$/35 | 2.0 × 10$^6$/5 | 2.0 × 10$^6$/20 | —/— |
| HDPE-A   Mw[1]/% by mass | 3.5 × 10$^5$/65 | 3.5 × 10$^5$/95 | 3.5 × 10$^5$/80 | —/— |
| Terminal Vinyl Group Conc.[2] | 0.9 | 0.9 | 0.9 | — |
| Mw[1]/Mw/Mn[3] of PE Composition A | 9.3 × 10$^5$/24.5 | 4.6 × 10$^5$/15.9 | 6.8 × 10$^5$/21.5 | —/— |
| Tm[4] (° C.)/Tcd[5] (° C.) of PE Composition A | 135/100 | 135/100 | 135/100 | —/— |
| PE Composition B | | | | |
| UHMWPE   Mw[1]/% by mass | 2.0 × 10$^6$/18 | 2.0 × 10$^6$/5 | —/— | 2.0 × 10$^6$/20 |
| HDPE-B   Mw[1]/% by mass | 3.0 × 10$^5$/82 | 3.0 × 10$^5$/95 | —/— | 3.0 × 10$^5$/80 |
| Terminal Vinyl Group Conc.[2] | 0.1 | 0.1 | — | 0.1 |
| Mw[1]/Mw/Mn[3] of PE Composition B | 5.9 × 10$^5$/14.7 | 3.8 × 10$^5$/11.0 | —/— | 6.4 × 10$^5$/15.2 |
| Tm[4] (° C.)/Tcd[5] (° C.) of PE Composition B | 135/100 | 135/100 | —/— | 135/100 |
| Production Conditions | | | | |
| Conc. (% by mass) of PE Composition A | 40 | 40 | 30 | — |
| Conc. (% by mass) of PE Composition B | 15 | 20 | — | 30 |
| Extrudate | | | | |
| Layer Structure | A/B/A | — | — | — |
| Layer Thickness Ratio | 2/1/2 | — | — | — |
| Stretching | | | | |
| Gel-Like Laminate Sheet | | | | |
| Temp. (° C.)/(MD × TD)[6] | 115/5 × 5 | —/— | —/— | —/— |
| Gel-Like Sheet A | | | | |
| Temp. (° C.)/(MD × TD)[6] | —/— | 115/5 × 5 | 115/5 × 5 | —/— |
| Gel-Like Sheet B | | | | |
| Temp. (° C.)/(MD × TD)[6] | —/— | 115/5 × 5 | —/— | 115/5 × 5 |
| Lamination | | | | |
| TEMP. (° C.)/Pressure (MPa) | —/— | 130/0.05 | —/— | —/— |
| Layer Structure | — | A/B | — | — |
| Layer Thickness Ratio | — | 1/1 | — | — |
| Re-Stretching | | | | |
| Temp. (° C.)/Stretching Direction/Magnification | 128.5/TD/1.4 | —/—/— | —/—/— | —/—/— |
| Heat-Setting | | | | |
| Temp. (° C.)/Time (minute) | 128.5/10 | 130/10 | 125/10 | 128/10 |

TABLE 1-continued

| Properties of Microporous Membrane | | | | |
|---|---|---|---|---|
| Average Thickness (μm) | 22.4 | 21 | 20 | 20 |
| Air Permeability (sec/100 cm³/20 μm) | 211 | 312 | 500 | 400 |
| Porosity (%) | 43 | 40 | 38 | 40 |
| Pin Puncture Strength (g/20 μm, mN/20 μm) | 550/5,390 | 535/5,243 | 470/4,606 | 520/5,096 |
| Tensile Rupture Strength (kg/cm², kPa) | | | | |
| MD | 1,240/121,520 | 1,280/125,440 | 1,250/122,500 | 1,300/127,400 |
| TD | 1,550/151,900 | 1,160/113,680 | 1,150/112,700 | 1,200/117,600 |
| Tensile Rupture Elongation (%) MD/TD | 165/110 | 145/240 | 150/270 | 145/260 |
| Heat Shrinkage Ratio (%) MD/TD | 2/3 | 2/1 | 6/4 | 5/3 |
| Thermal Properties | | | | |
| SD Temperature (° C.)[7] | 140 | 140 | 135 | 140 |
| MD Temperature (° C.)[8] | 165 | 160 | 165 | 160 |
| SD Speed[9] (sec/100 cm³/20 μm) | 2,358 | 4,115 | 4,599 | 651 |
| Voltage Drop (V) | 0.1 | 0.1 | 0.7 | 0.1 |

| | No. Comp. Ex. 3 |
|---|---|
| Composition of Polyethylene Resin | |
| PE Composition | |
| UHMWPE    Mw[1]/% by mass | $2.0 \times 10^6$/40 |
| HDPE-A    Mw[1]/% by mass | $3.5 \times 10^5$/30 |
| Terminal Vinyl Group Conc.[2] | 0.9 |
| HDPE-B    Mw[1]/% by mass | $3.0 \times 10^5$/30 |
| Terminal Vinyl Group Conc.[2] | 0.1 |
| Mw[1]/Mw/Mn[3] of PE Composition A | $9.9 \times 10^5$/22.7 |
| Tm[4] (° C.)/Tcd[5] (° C.) of PE Composition A | 135/100 |
| Production Conditions | |
| Conc. (% by mass) of PE Composition | 25 |
| Extrudate | |
| Layer Structure | — |
| Layer Thickness Ratio | — |
| Stretching | |
| Temp. (° C.)/(MD × TD)[6] | 116/5 × 5 |
| Lamination | |
| Temp. (° C.)/Pressure (MPa) | —/— |
| Layer Structure | — |
| Layer Thickness Ratio | — |
| Re-Stretching | |
| Temp. (° C.)/Stretching Direction/Magnification | —/—/— |
| Heat-Setting | |
| Temp. (° C.)/Time (minute) | 127/10 |
| Properties of Microporous Membrane | |
| Average Thickness (μm) | 20 |
| Air Permeability (sec/100 cm³/20 μm) | 400 |
| Porosity (%) | 40 |
| Pin Puncture Strength (g/20 μm, mN/20 μm) | 490/4,802 |
| Tensile Rupture Strength (kg/cm², kPa) | |
| MD | 1,270/124,460 |
| TD | 1,180/115,640 |
| Tensile Rupture Elongation (%) MD/TD | 150/250 |
| Heat Shrinkage Ratio (%) MD/TD | 5/4 |

TABLE 1-continued

| Thermal Properties | |
|---|---|
| SD Temperature (° C.)[7] | 137 |
| MD Temperature (° C.)[8] | 160 |
| SD Speed[9] (sec/100 cm³/20 μm) | 995 |
| Voltage Drop (V) | 0.4 |

Note:
[1]Mw represents a mass-average molecular weight.
[2]The terminal vinyl group concentration (/10,000 C) per 10,000 carbon atoms when measured by infrared spectroscopy.
[3]Mw/Mn represents a molecular weight distribution expressed by a ratio of mass-average molecular weight Mw to number-average molecular weight Mn.
[4]Tm represents a melting point.
[5]Ted represents a crystal disperson temperature.
[6]MD represents a longitudinal direction, and TD represents a transverse direction.
[7]SD temperature represents a shutdown temperature.
[8]MD temperature represents a meltdown temperature.
[9]SD speed represents a shutdown speed.

It is clear from Table 1 that the multi-layer, microporous polyethylene membranes of Examples 1 to 5 had well-balanced permeability, mechanical strength, heat shrinkage resistance, shutdown properties, meltdown properties and oxidation resistance, being particularly excellent in a shutdown speed.

On the other hand, because the membrane of Comparative Example 1 was composed only of the polyethylene composition A containing HDPE-A and did not have a layer containing HDPE-B, it was poorer in permeability and oxidation resistance than those of Examples 1 to 5. Because the membrane of Comparative Example 2 was composed only of the polyethylene composition B containing HDPE-B and did not have a layer containing HDPE-A, it was poorer in a shutdown speed than those of Examples 1 to 5. Because the membrane of Comparative Example 3 was composed of a polyethylene composition containing blended HDPE-A and HDPE-B and did not have a laminar structure, it was poorer in a shutdown speed and oxidation resistance than those of Examples 1 to 5.

EFFECT OF THE INVENTION

The multi-layer, microporous polyethylene membrane of this invention has well-balanced permeability, mechanical strength, heat shrinkage resistance, shutdown properties, meltdown properties and oxidation resistance. The method of this invention can produce such multi-layer, microporous polyethylene membrane efficiently. Particularly the provision of a resin concentration difference between two polyethylene resin solutions containing high-density polyethylenes having different terminal vinyl group concentrations makes it easy to control an average pore diameter distribution in a thickness direction of the multi-layer, microporous polyethylene membrane. A ratio of a coarse-structure layer having a larger average pore diameter to a dense-structure layer having a smaller average pore diameter, and a pore size in each layer can also be easily controlled. The use of the multi-layer, microporous polyethylene membrane of this invention as a separator provides batteries with excellent capacity, cyclability, discharge properties, heat resistance, storability and productivity.

What is claimed is:

1. A multi-layer, microporous polyethylene membrane having at least two layers, which comprises (a) a microporous polyethylene resin layer A comprising high-density polyethylene A having a mass-average molecular weight of $1 \times 10^4$ to $5 \times 10^5$ and having 0.2 or more terminal vinyl groups per 10,000 carbon atoms when measured by infrared spectroscopy, and (b) a microporous polyethylene resin layer B comprising high-density polyethylene B having a mass-average molecular weight of $1 \times 10^4$ to $5 \times 10^5$ and having less than 0.2 terminal vinyl groups per 10,000 carbon atoms when measured by infrared spectroscopy, wherein high-density polyethylene A is the only high-density polyethylene having a mass-average molecular weight of $1 \times 10^4$ to $5 \times 10^5$ and having terminal vinyl groups in layer A and high-density polyethylene B is the only high-density polyethylene having a mass-average molecular weight of $1 \times 10^4$ to $5 \times 10^5$ and having terminal vinyl groups in layer B.

* * * * *